J. W. MOONEY & E. R. KERBY.
TRAIN PIPE COUPLING.
APPLICATION FILED OCT. 24, 1908.
999,176.
Patented July 25, 1911.
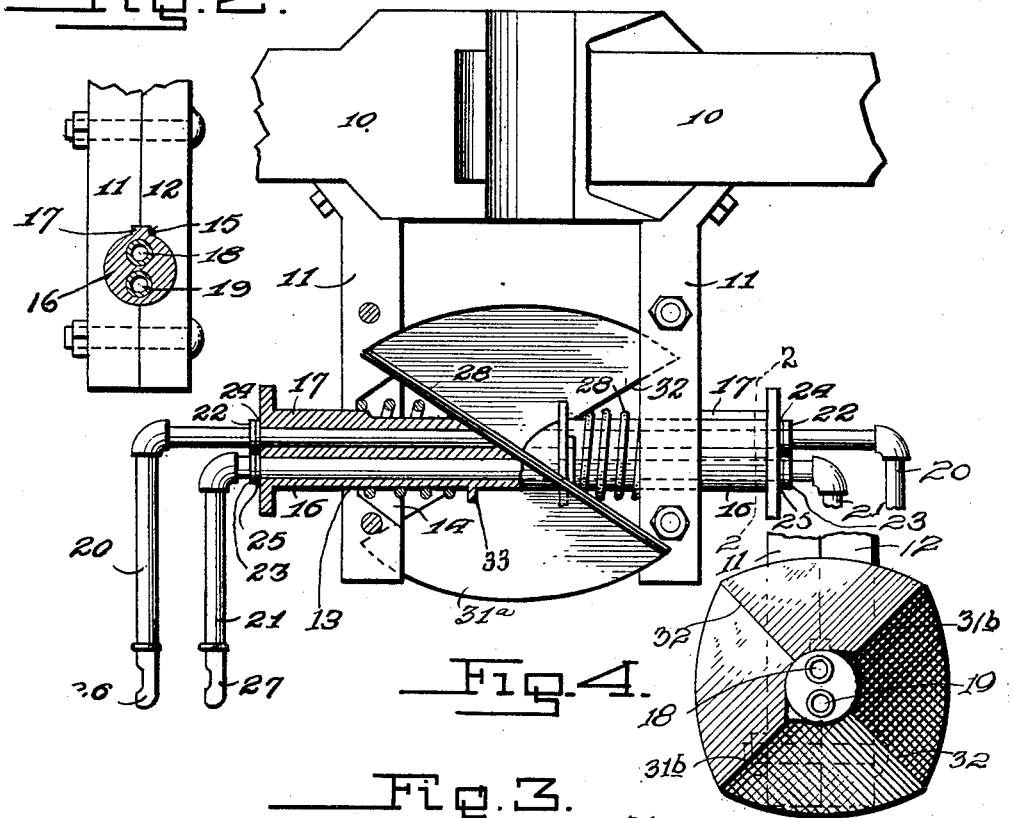
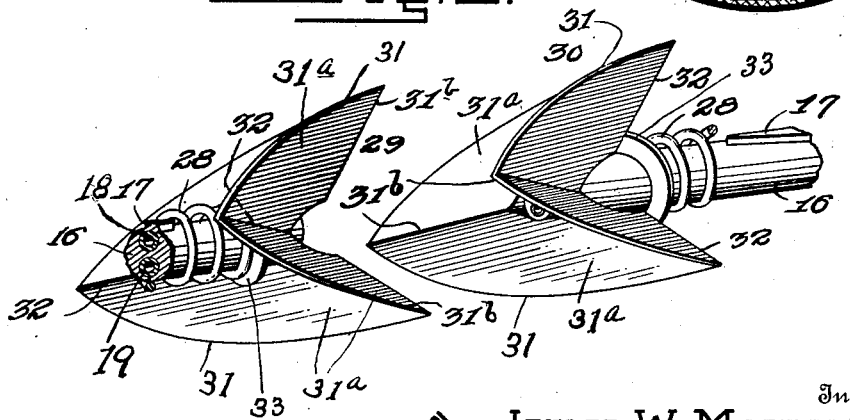
Witnesses
C. Everett Lancaster.
H. Joseva Doyle
Inventors
James W. Mooney,
and Elmas R Kerby,
By E. E. Vrooman,
their Attorney.

UNITED STATES PATENT OFFICE.

JAMES W. MOONEY AND ELMAS R. KERBY, OF LAWTON, OKLAHOMA.

TRAIN-PIPE COUPLING.

999,176.  Specification of Letters Patent.  Patented July 25, 1911.

Application filed October 24, 1908. Serial No. 459,355.

*To all whom it may concern:*

Be it known that we, JAMES W. MOONEY and ELMAS R. KERBY, citizens of the United States, residing at Lawton, in the county of Comanche and State of Oklahoma, have invented certain new and useful Improvements in Train-Pipe Couplings, of which the following is a specification, reference being had therein to the accompanying drawing.

This invention relates to train pipe couplings and has especially in view certain new and useful improvements in the coupling means which permits of an automatic and absolutely air-tight connection being had between cars.

With the above and many other objects in view, the invention contemplates the employment of novel types of hangers which form guides for spring pressed coupling sleeves, the meeting ends of which are provided with interlocking and nesting coupling heads which, when in their coupled position, form an air-tight joint between the said coupling sleeves.

In carrying out the objects of the invention, it will, of course, be obvious that changes in details and structural arrangements may be resorted to, but a preferred and practical embodiment of the same is illustrated in the accompanying drawing, wherein:—

Figure 1 is a view of the improved train pipe coupling partly in elevation and partly in longitudinal section. Fig. 2 is a transverse vertical sectional view of the sleeve taken on the line 2—2, Fig. 1. Fig. 3 is a detail fragmentary perspective view of the pair of coupling heads and their sleeves, the heads being shown disengaged. Fig. 4 is a view in front elevation of one of the coupler heads.

Like characters of reference designate corresponding parts.

Referring to said accompanying drawings, 10 designates the draw-bars of the ordinary Janney car coupler, from the heads of which depend the air pipe hangers, preferably formed of two vertical members 11 and 12 which may be bolted or otherwise fastened together, and which are also suitably secured in a rigid manner to said heads to insure of said hangers being, at all times, held in position firmly. The lower portion of the two members forming the hanger have complemental grooves through them, which form a guide opening 13, the outer portion of which is flared outwardly, as indicated at 14, to form a seat for a spring and permit oscillation of the coupler, as will presently appear. The upper portion of said guide opening is provided with a wedging slot 15. A coupler sleeve 16 is mounted in and guided by said guide opening 13, said coupler sleeve being provided with a wedge 17 which engages with said wedging slot 15. Said coupler sleeve has formed through it air openings 18 and 19, the inner ends of which have the usual depending pipes 20 and 21 screwed thereinto, and which are held in air-tight relation through the medium of lock nuts 22 and 23 carrying gaskets 24 and 25 which engage with the threads formed on said pipes and which also tightly seal the connection between the pipes and said openings against leakage of air. The depending pipes 20 and 21 are equipped with hose couplings 26 and 27 which may be of the usual or any preferred form.

As will be seen by reference to Fig. 1 of the accompanying drawings, the coupler sleeves project through their respective hangers, and upon said projected portion they have mounted a coiled spring 28, one terminal of which lies contiguous with the spring seat 14, the other terminal bearing against a collar 33 provided on each of the coupler heads 29 and 30, the arrangement being such that the tension of the said spring is constantly exerted to project the said coupler sleeve forwardly, and cause the wedge 17 to have a firm binding engagement within the wedging slot 15, and thereby permit the said sleeve to be normally held in a fixed position relative to its hanger.

The coupler heads 29 and 30 are preferably constructed integral with their sleeves, are duplicates of each other and are so arranged relatively to each other that they will have an interlocking nested engagement when in coupled relation. Each head is provided with a pair of guide members 31, each comprising two flat divergent wings meeting in an edge 31$^b$ which extends forwardly and outwardly from the sleeve 16. The adjacent wings of each pair of guide members meet in a rearwardly and outwardly extending edge 32. The four wings of each head are so placed that a plane embracing the forward meeting edges 31$^b$ will be at right angles to a plane embracing the rearward meeting edges 32. Moreover, the heads are so fastened on the car that a plane through the forward edges 31ᵇ of each head will make an angle of 45° with the rail level. The heads to be coupled are arranged in the positions shown in Fig. 3, that is, the guide members of one head have their forward portions arranged to be fitted between the forward portions of the guide members of the other head, so that the two sets of guide members will have an interlocking nested engagement when coupled.

It will be seen from the foregoing that the described type of coupler heads permit said heads to be coupled in interlocking nested engagement so that the air openings of the sleeves will have their outer ends connected to form continuous passages through said sleeves. It will also be observed that by forming the guide openings 13 in the hangers, a small bearing surface is provided for the coupler sleeves, which allows for a slight movement of the same when such is necessary, as for instance, when the coupler head on one car is lower than the head on the other car.

What we claim is:—

1. A coupling for train pipes of air-brake systems comprising a hanger carried by a car and formed of two vertical members held in rigid engagement and having a guide opening formed through them which has an outwardly-flared face and an upper wedging slot, a sleeve mounted in said guide opening and carrying a wedge for engagement in said slot, a spring coiled about said sleeve and exerting a pressure tending to project the same through said guide opening, and a coupling head carried by said sleeve.

2. A coupling device for train pipes of air-brakes, comprising a sleeve, and a head therefor provided with a pair of guide members, said guide members being formed of a pair of flat divergent integral wings which have a meeting edge that extends forwardly and outwardly from said sleeve, the adjacent wings of each pair of guide members having a meeting edge that extends rearwardly and outwardly.

3. A coupling device for train pipes of air-brakes comprising a pair of sleeves, means for yieldably supporting the same, and heads carried by said sleeves, adapted for interlocking nested engagement, said heads being provided with guides formed of divergently-arranged wings, the forwardly-projecting meeting edges of which project outwardly from said sleeves and the rear meeting edges of said wings project outwardly relative to said sleeves so that a plane embracing said forward meeting edges will be at right angles to a plane embracing the rear meeting edges.

In testimony whereof we hereunto affix our signatures in presence of two witnesses.

JAMES W. MOONEY.
ELMAS R. KERBY.

Witnesses:
J. A. PIKE,
J. W. PERRY.

---

Copies of this patent may be obtained for five cents each, by addressing the "Commissioner of Patents, Washington, D. C."